United States Patent
Romano et al.

(10) Patent No.: US 10,877,622 B2
(45) Date of Patent: Dec. 29, 2020

(54) DETECTION OF STRUCTURED LIGHT FOR DEPTH SENSING

(71) Applicant: Facebook Technologies, LLC, Menlo Park, CA (US)

(72) Inventors: Nitay Romano, Sunnyvale, CA (US); Ricardo Garcia, San Mateo, CA (US); Nadav Grossinger, Foster City, CA (US); Robert Hasbun, San Jose, CA (US); Niv Kantor, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 33 days.

(21) Appl. No.: 16/116,505

(22) Filed: Aug. 29, 2018

(65) Prior Publication Data
US 2020/0073531 A1 Mar. 5, 2020

(51) Int. Cl.
G06F 3/0481 (2013.01)
G06T 19/00 (2011.01)
G01B 11/25 (2006.01)
H04N 9/31 (2006.01)
G02B 27/01 (2006.01)
(Continued)

(52) U.S. Cl.
CPC .......... *G06F 3/04815* (2013.01); *G01B 11/25* (2013.01); *G02B 27/0172* (2013.01); *G06K 9/00671* (2013.01); *G06T 19/006* (2013.01); *H04N 9/31* (2013.01); *H04N 13/344* (2018.05)

(58) Field of Classification Search
CPC . G06F 3/04815; G06T 19/006; H04N 13/344; H04N 9/31; G02B 27/0172; G06K 9/00671; G01B 11/25
See application file for complete search history.

(56) References Cited

U.S. PATENT DOCUMENTS

2012/0056982 A1* 3/2012 Katz ................. G06T 7/521
348/43
2013/0093788 A1 4/2013 Liu
(Continued)

OTHER PUBLICATIONS

International Search Report and Written Opinion for International Application No. PCT/US2018/053071, dated May 27, 2019.

*Primary Examiner* — Michael Le
(74) *Attorney, Agent, or Firm* — Baker Botts L.L.P.

(57) ABSTRACT

In one embodiment, a computing system may access a first image and a second image of at least a common portion of an environment while a light emission with a predetermined emission pattern is projected by a projector. The first and second images are respectively captured by a first and a second detector that are respectively separated from the projector by a first and a second distance. The system may determine that a first portion of the first image corresponds to a second portion of the second image. The system may compute, using triangulation, a first depth value associated with the first portion and a second depth value associated with the second portion. The system may determine that the first and second depth values match in accordance with one or more predetermined criteria, and generate a depth map of the environment based on at least one of the depth values.

19 Claims, 8 Drawing Sheets
(3 of 8 Drawing Sheet(s) Filed in Color)

(51) Int. Cl.
*H04N 13/344* (2018.01)
*G06K 9/00* (2006.01)

(56) References Cited

U.S. PATENT DOCUMENTS

| | | | |
|---|---|---|---|
| 2013/0300637 A1* | 11/2013 | Smits | G02B 5/128 |
| | | | 345/8 |
| 2015/0042680 A1* | 2/2015 | Grossinger | G06F 3/017 |
| | | | 345/633 |
| 2015/0278992 A1* | 10/2015 | Smits | G02B 27/2235 |
| | | | 345/660 |
| 2015/0302665 A1 | 10/2015 | Miller | |
| 2016/0253812 A1* | 9/2016 | Grossinger | G01B 11/25 |
| | | | 356/614 |
| 2016/0262608 A1 | 9/2016 | Krueger | |
| 2018/0061056 A1* | 3/2018 | Zhao | G06K 9/2036 |

\* cited by examiner

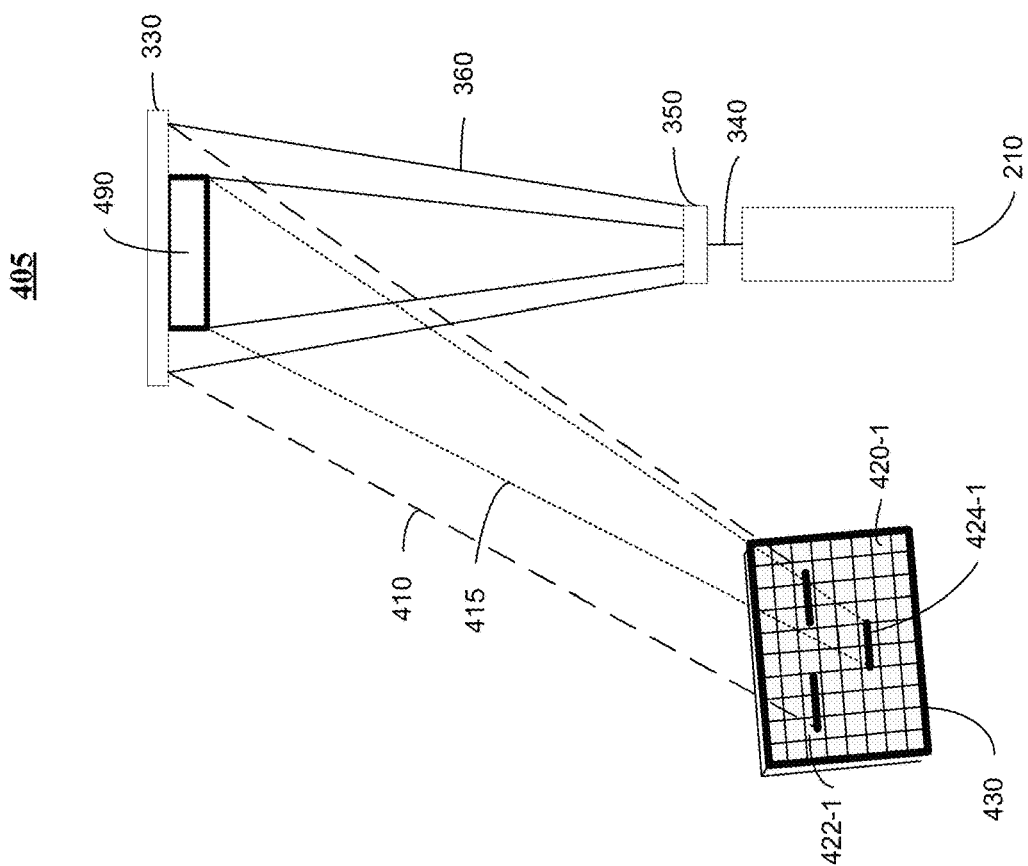
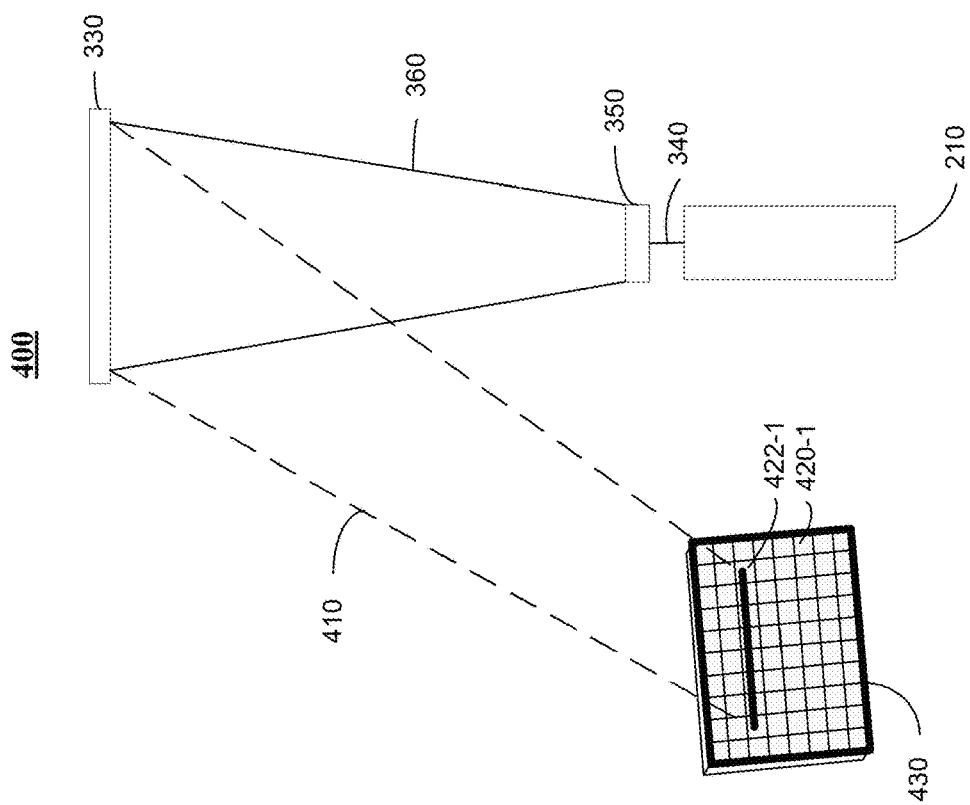
FIG. 4B
FIG. 4A

DETECTION OF STRUCTURED LIGHT FOR DEPTH SENSING

TECHNICAL FIELD

This disclosure generally relates to artificial reality, such as virtual reality and augmented reality.

BACKGROUND

Artificial reality is an alteration of perception to produce an effect. Artificial reality may include virtual reality, mixed reality, augmented reality, and so forth. For example, in mixed reality, a user environment may be altered to include one or more virtual objects. In some embodiments, the user may interact with the virtual object in a manner that is similar to the way in which the user interacts with physical objects within the user environment. In order to create a perception of an altered user environment, artificial reality systems may use a combination of visual, audio, and tactile effects. For example, a user may wear a head-mounted display. The head-mounted display may produce one or more visual effects, such as integrating virtual objects in a user environment. Artificial reality applications, products, accessories, services, or some combination thereof may be used in conjunction with an artificial reality system and/or incorporated within the artificial reality system. In various embodiments, components of an artificial reality system (e.g., a head-mounted display), may be connected and/or networked with a host computer system, a mobile device or computing system, or any other hardware platform capable of providing artificial reality content to one or more users.

One challenge in artificial reality is accurately determining the position of objects in the environment around a user. Inserting virtual objects into a scene and/or overlaying virtual images onto physical objects and/or physical spaces requires a precise knowledge of the physical user environment. Depth sensing is a technique for obtaining the three-dimensional (3D) presence, location, and characteristics of objects in an environment. Depth sensing may be implemented in artificial reality systems to provide an accurate mapping of a user's environment. Notably, many depth sensing systems are expensive and cumbersome. Accordingly, depth sensing solutions may not be readily integrated in light-weight artificial reality systems.

SUMMARY OF PARTICULAR EMBODIMENTS

Particular embodiments described herein relate to depth sensing using structured light. In various embodiments, a depth sensing set-up includes a projector and two or more detectors. The projector emits structured light of a known pattern into an environment and the detector detects emitted light reflected off of objects in the environment. The structured light provides useful cues and simplifies the computation of depth information of objects within the environment. For example, by triangulating emitted light and detected reflected light, three-dimensional features of objects in a system environment can be resolved.

In various embodiments, a projector and two or more detectors may be located in a head-mounted display (HMD). In various embodiments, the detectors may be a pair of stereo cameras in the head-mounted display. The stereo cameras may be used for inside-outside position tracking, which is a self-referential determination of the head-mounted display position based on a relative displacement between the head-mounted display and one or more detected objects in the environment. For example, position data generated by the stereo cameras may be analyzed to determine a position of the head-mounted display relative to one or more objects in the environment. In addition, these cameras may facilitate image-based stereo depth sensing, object detection, and object recognition. The stereo cameras used for such purposes may be unfiltered cameras that are not preferentially sensitive to particular frequencies of light, but instead, detect light across a broad frequency band. In various embodiments, the unfiltered, inside-outside cameras of the head-mounted display may be repurposed for detecting structured light emitted by a projector. Using the unfiltered stereo cameras as detectors for structured light has several advantages, including limiting power demand (since the head-mounted display doesn't have to support a separate set of detectors), saving real estate on the head-mounted display form factor, and reducing the bill of materials for the head-mounted display.

However, one drawback of utilizing unfiltered inside-outside cameras for detecting structured light is that it may be challenging for unfiltered cameras to distinguish ambient light from reflections of the structured light. For example, if a reflected light beam intensity is low relative to ambient light or they are similar in wavelength, the reflected beam of light may be indistinguishable from ambient background light. As another example, other light sources in an environment may have similar lighting characteristics (e.g., wavelength, intensity, etc.) as the structured light and may, therefore, be indistinguishable from the structured light based on lighting characteristics alone.

Accordingly, in one embodiment, the depth sensing solution includes projecting a known structured light pattern into the environment and using two detectors (e.g., unfiltered stereo cameras) to disambiguate reflections of the structured light from other detected lighting. As the projector projects structured light into the environment, the two unfiltered cameras, which are configured to have substantially overlapping fields of view, may simultaneously capture images of the environment. For ease of reference, the simultaneously captured images may be referred to as a first image and a second image, which are respectively captured by a first camera and a second camera. Portions of the first and second images that correspond to each other may be determined using any suitable stereo correspondence or matching algorithms. To determine whether a candidate pixel in the first image corresponds to the structured light, a first depth value associated with that candidate pixel may be compared with a second depth value associated with a corresponding pixel in the second image. If the two depth values are sufficiently similar (e.g., within a predetermined threshold distance or distance ratio), then the system may conclude that the pixel corresponds to the structured light. The first depth value associated with the candidate pixel in the first image may be computed using triangulation techniques, where dimensions of the triangle used for triangulation may be determined based on the first camera, the location of the candidate pixel in the first image, the projector, and the known structured lighting pattern projected by the projector. The second depth value may also be computed using triangulation, where dimensions of the triangle may be determined based on the second camera, the location of the corresponding pixel in the second image, the projector, and the known structured lighting pattern projected by the projector.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4A illustrates an example detection event, according to various embodiments.

FIG. 4B illustrates an example detection event of a surface abnormality, according to various embodiments.

DESCRIPTION OF EXAMPLE EMBODIMENTS

Figure 1:
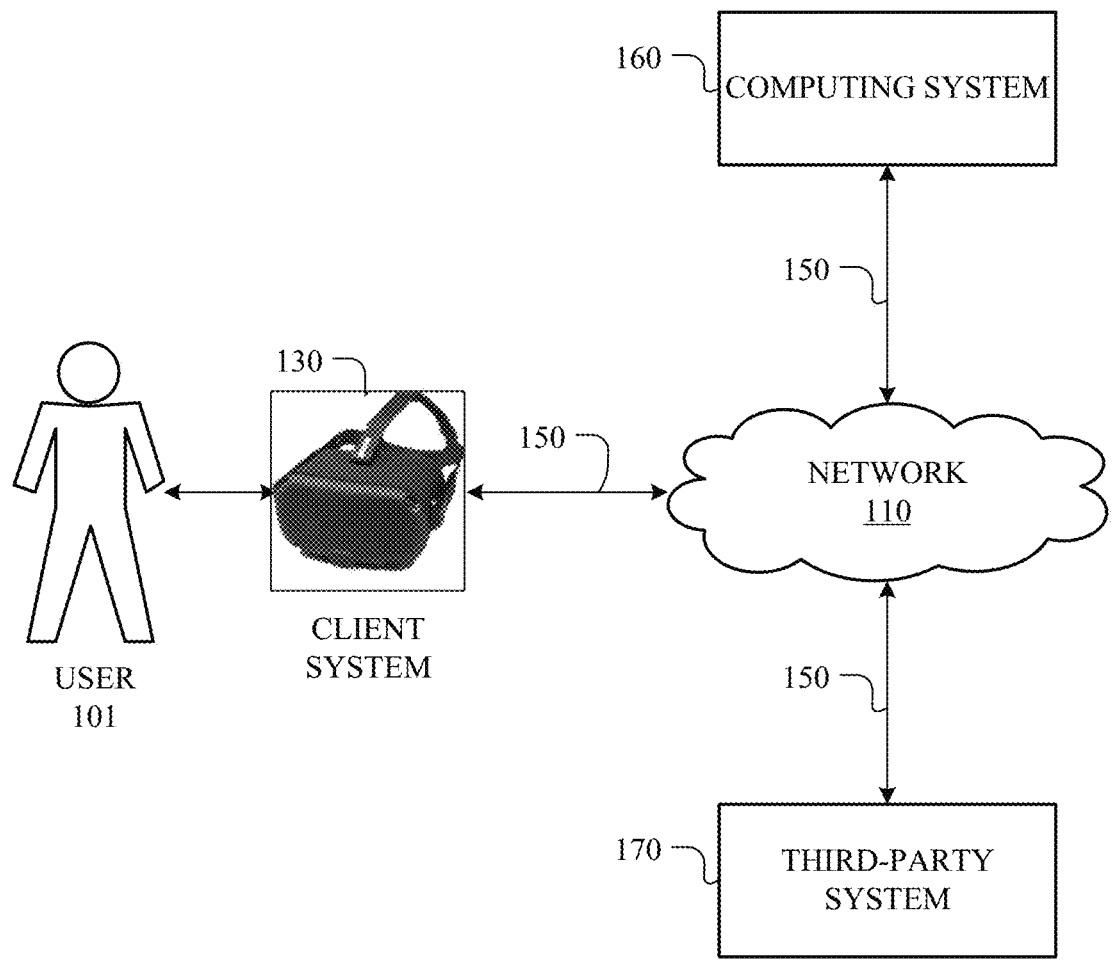
FIG. 1 illustrates an example network environment associated with a computing system.

FIG. 1 illustrates an example network environment 100 associated with a computing system 160. Network environment 100 includes a user 101, a client system 130 (e.g., a head-mounted display), a computing system 160, and a third-party system 170 connected to each other by a network 110. Although FIG. 1 illustrates a particular arrangement of user 101, client system 130, computing system 160, third-party system 170, and network 110, this disclosure contemplates any suitable arrangement of user 101, client system 130, computing system 160, third-party system 170, and network 110. As an example and not by way of limitation, two or more of client system 130, computing system 160, and third-party system 170 may be connected to each other directly, bypassing network 110. As another example, two or more of client system 130, computing system 160, and third-party system 170 may be physically or logically co-located with each other in whole or in part. Moreover, although FIG. 1 illustrates a particular number of users 101, client systems 130, computing systems 160, third-party systems 170, and networks 110, this disclosure contemplates any suitable number of users 101, client systems 130, computing systems 160, third-party systems 170, and networks 110. As an example and not by way of limitation, network environment 100 may include multiple users 101, client system 130, computing systems 160, third-party systems 170, and networks 110.

In particular embodiments, user 101 may be an individual (e.g., a human user) that interacts or communicates with or over computing system 160. In particular embodiments, computing system 160 may generate, store, receive, and send data related to generating an artificial reality environment, including, for example, and without limitation, visual data, audio data, tactile data, and so forth. Computing system 160 may be accessed by the other components of network environment 100 either directly or via network 110. In particular embodiments, third-party system 170 may be structured-light projectors and/or detectors, wall-mounted speaker system, a mobile sensor system, a haptic actuator, and so forth. Third-party system 170 may be accessed by the other components of network environment 100 either directly or via network 110. In particular embodiments, one or more client systems 130, such as a head-mounted display, may access, send data to, and receive data from computing system 160 and/or third-party system 170. Client system 130 may access computing system 160 or third-party system 170 directly, via network 110, or via a third-party system. As an example and not by way of limitation, client system 130 may access third-party system 170 via computing system 160. Client system 130 may be any suitable computing device, such as, for example, a head-mounted display, augmented/virtual reality device, and so forth.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, computing system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi, Bluetooth, or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
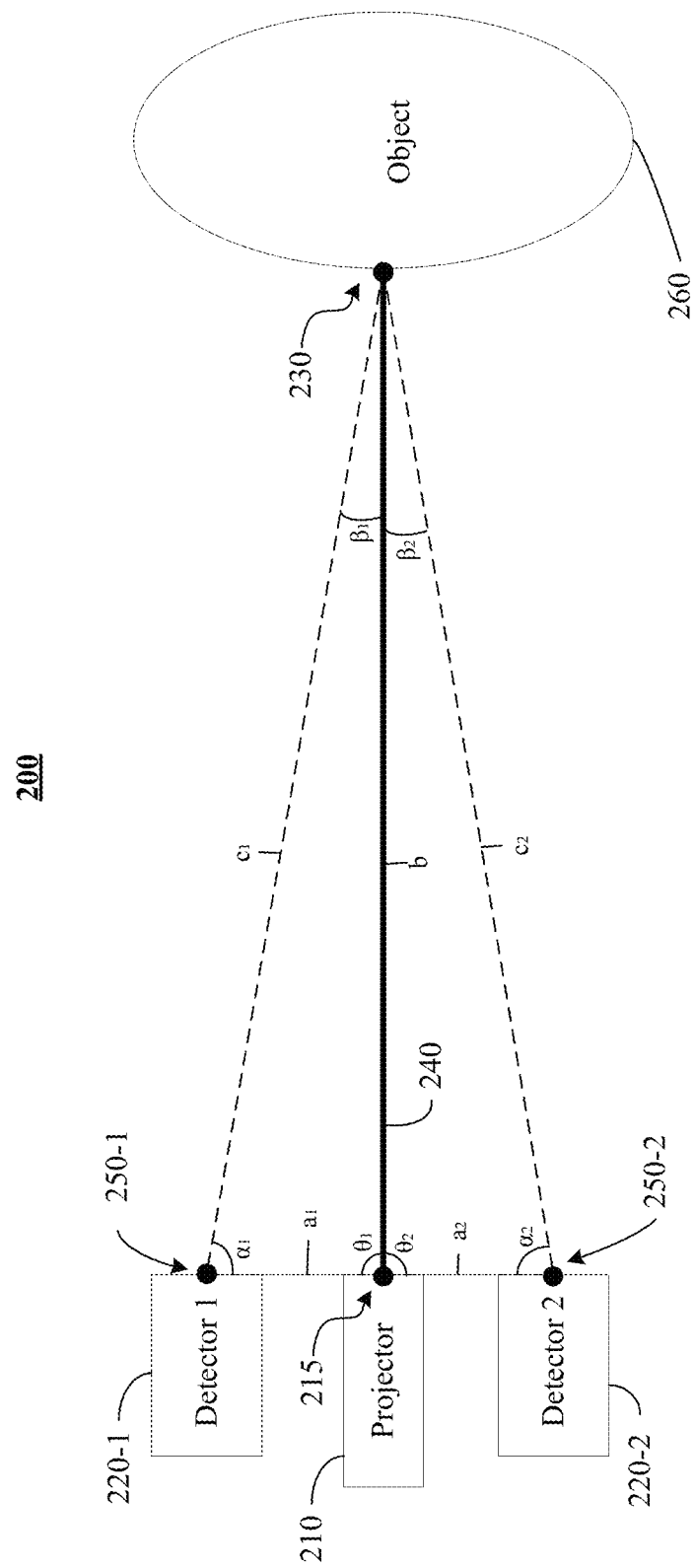
FIG. 2 illustrates an example of a triangulation computation, according to various embodiments.

FIG. 2 illustrates an example of a triangulation computation, according to various embodiments. For simplicity, the figure shows the triangulation as a two-dimensional setup, but one of ordinary skill in the art would recognize that the same concept can be applied in three dimensions. System environment 200 includes a projector 210, which, for triangulation purposes, may be represented by a projector location 215 (e.g., a point representation of the projector's lens). Conceptually, light emission 240 is projected from the projector location 215 (shown as a single beam for simplicity, but the emission could be multiple beams or planes) and intersects an object 260 at reflection point 230. The system environment 200, in particular embodiments, further includes two detectors 220-1 and 220-2 (collectively referred to as detectors 220) configured to have substantially overlapping fields of view. For purposes of the triangulation computation, detectors 220-1 and 220-2 may be represented by detector location 250-1 and detector location 250-2, respectively (collectively referred to as detector locations 250). In particular embodiments, the detector locations 250 may be pin-hole lenses that are conceptually defined for the detectors 220.

Projector 210 may include any type of device that is capable of emitting light. For example, projector 210 may include a laser emitter, such as a vertical-cavity surface-emitting laser (VCSEL). Functionally, projector 210 emits light emission 240 into system environment 200. Light emission 240 may have various characteristics, such as a beam size, a beam shape, a beam intensity, a beam wavelength, and so forth. In particular embodiments, light emission 240 may be a coherent, collimated emission of light (e.g., a laser). Light emission 240 may travel through system environment 200 in the form of a line, a grid, a torus, and so forth. In addition, light emission 240 may include multiple instances of one or more forms (e.g., two or more lines, two or more torus shapes, two or more grids, etc.). In various embodiments, light emission 240 interacts with objects that lie in the path of light emission 240 (e.g., object 260). The object could be, for example and not by way of limitation, a wall, a chair, a human, an animal, a tree, a plant, a curved surface, a mesh, and so forth. For example, object 260 may reflect and/or absorb some or all of light emission 240. In particular, line $c_1$ may represent a portion of light emission 240 reflected by object 260 that is incident on detector 220-1. Similarly, line $c_2$ may represent a portion of light emission 240 reflected by object 260 that is incident on detector 220-2.

Detector 220-1 and detector 220-2 may be any type of device that is capable of detecting light. For example, either or both of detector 220-1 and detector 220-2 may be an inside-outside light detector or camera mounted on a mobile platform, an array sensor (e.g., a linear array sensor, a planar array sensor, a circular array sensor, etc.), and so forth. In various embodiments, detector 220-1 and detector 220-2 may be unfiltered. Accordingly, detector 220-1 and detector 220-2 may exhibit a similar detection sensitivity to various wavelengths of light, without exhibit of preferential detection sensitivity to select wavelength bands of light, such as the wavelength of the light emission 240. Operationally, detector 220-1 detects light traveling into a detector aperture (not shown). In some embodiments, detector 220-1 and detector 220-2 may each include one or more lenses that focus light. For example, and not by way of limitation, a lens may focus light traveling along line $c_1$ to an image sensor of detector 220-1. In various embodiments, detector 220-1 transmits the position of the detected light to a client system 130 (e.g., a head-mounted display) for determining the position of objects in system environment 200.

In various embodiments, a processor in the head-mounted display executes an AR application (stored in any or all of the client system 130, the computing system 160, or the third-party system 170) to process data received from the detectors 220. For example, the AR application may analyze inputs received from the detector 220-1 to identify signals corresponding to the reflection point 230 of the light emission 240. For example, the AR application could filter out signals corresponding to light below a preset threshold intensity. Once the AR application identifies a candidate detector signal that may correspond to the reflection point 230, the AR application may verify that it, in fact, corresponds to the reflection point 230 and calculate the depth of the reflection point 230 on the object 260 using triangulation techniques.

The geometric relationship between the projector 210, each of the detectors 220, and the reflection point 230 on the object 260 may be used to form the basis for triangulation computation. The line $a_1$ represents a known baseline distance between the projector location 215 and the detector location 250-1 of detector 220-1. Similarly, line $a_2$ represents a known baseline distance between the projector location 215 and the detector location 250-2 of detector 220-2. Further, line b represents the path of light emission 240 emitted from the projector location 215. Light emission 240 may reflect off of an object 260 at reflection point 230. Line $c_1$ may represent the path of reflected light traveling towards detector location 250-1 from the reflection point 230, and line $c_2$ may represent the path of reflected light traveling towards detector location 250-2 from the reflection point 230.

Accordingly, a first triangle (herein referred to as "triangle 1") may be described by the line $a_1$, line $c_1$, and line b, forming angle $\alpha_1$ between line $a_1$ and line $c_1$, angle $\beta_1$ between line $c_1$ and line b, and an angle $\theta_1$ between line b and line $a_1$. As described above, the length of line $a_1$ is known since it may be pre-computed based on the fixed detector location 250-1 and the fixed projector location 215. In particular embodiments, the angle $\theta_1$ may also be known since the trajectory of the light emission 240 relative to the fixed relative positions between detector location 250-1 and projector location 215 (represented by baseline $a_1$) is known. Although the angle $\theta_1$ illustrated in FIG. 2 appears to be a right angle (i.e., a 90-degree angle), one of ordinary skill in the art would appreciate that $\theta_1$ is not limited to such and could be any other angle. Lastly, the angle $\alpha_1$ may be computed based on the location of the reflection point 230 in the field of view of detector 250-1. The point at which the reflection point 230 is captured by the sensor of detector 220-1 corresponds to a point in the image plane defined by the field of view of detector 220-1. Conceptually, where that point appears in the image plane is where the line $c_1$ intersects the image plane. That point of intersection in the image plane and the known center of the image plane, together with the known relationships between the center of the image plane and the detector location 250-1 (e.g., the distance between the center of the image plane and the detector location 250-1 and the angle between the image plane and the line connecting the detector location 250-1 and the center), may be used to compute the angle $\alpha_1$ (e.g., via triangulation). Once angle $\alpha_1$, side $a_1$, and angle $\theta_1$ are ascertained, the rest of the dimensions of triangle 1 could be computed based on known geometric properties of triangles. For example, the length of line b could be computed to represent a first depth of reflection point 230 from the projector location 215.

As previously described, one challenge with performing depth computations using emitted light is that the corresponding reflected light as captured by the detector needs to be accurately identified. If a point in the captured image is mistakenly identified as the reflection of the emitted light, the triangulation computation would be erroneous since various triangulation assumptions would not hold (e.g., if the mistakenly-identified point in the image does not correspond to the reflection point 230, it cannot be used to represent the point of intersection of line $c_1$ and the image plane and therefore the computation of the angle $\alpha_1$ would be erroneous). One way to assist with the detection of emitted light is to emit light in a particular wavelength (e.g., infrared) and use detectors with filters that are tailored for that wavelength. However, as previously described, doing so may not be practical in various applications. For example, if the depth sensing system is to be integrated with a head-mounted display with limited resources (e.g., power, real estate, and weight), adding a specialized filtered detector for detecting structured light may be infeasible or undesirable, especially since the head-mounted display may already have unfiltered cameras that are used for object detection and other sensory purposes.

To assist with accurate identification of emitted light, particular embodiments verify a that a candidate reflection point is, in fact, a reflection of the emitted light by performing a second depth computation for that point using information captured by a second unfiltered camera. Referring again to FIG. 2, a second triangle (herein referred to as "triangle 2") may be described by the line $a_2$, line $c_2$, and line b, forming angle $\alpha_2$ between line $a_2$ and line $c_2$, angle $\beta_2$ between line $c_2$ and line b, and angle $\theta_2$ between line b and line $a_2$. Similar to line $a_1$ and angle $\theta_1$, line $a_2$ and angle $\theta_2$ may be known due to the known relative fixed positions of the projector location 215 and detector location 250-2 and the trajectory of the emitted light 240. The computation of angle $\alpha_2$ may be similar to how $\alpha_1$ is computed, described in further detail above. In particular embodiments, a point in the image captured by detector 220-2 may be identified as corresponding to the reflection point 230 captured in the image of detector 220-1. In particular embodiments, the correspondence between the points in the two captured images may be determined using any suitable stereo correspondence or matching algorithms. Based on the location of such a point in the image plane defined by the field of view of detector 220-2, along with the known center of that image plane and the known relationships between the center of the image plane and the detector location 250-2 (e.g., the distance between the center of the image plane and the detector location 250-2 and the angle between the image plane and the line connecting the detector location 250-2 and the center), may be used to compute the angle $\alpha_2$ (e.g., via triangulation). Once angle $\alpha_2$, side $a_2$, and angle $\theta_2$ are ascertained, the rest of the dimensions of triangle 2 could be computed based on known geometric properties of triangles. For example, the length of line b could be computed to represent a second depth of reflection point 230 from the projector location. If the second depth of reflection point 230 computed using detector 220-2 differs (e.g., beyond a predetermined threshold) from the first depth computed using detector 220-1, then the reflection point 230 may be deemed to not correspond to the emitted light 240 and rejected.

Figure 3:
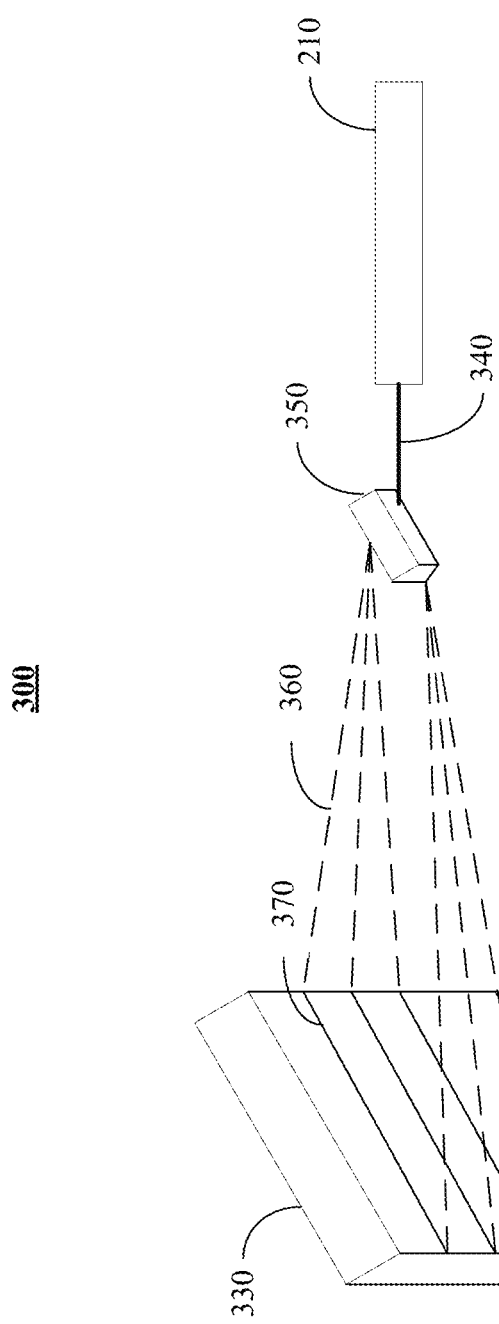
FIG. 3 illustrates an example projector set-up, according to various embodiments.

FIG. 3 illustrates an example of a projector 210, according to various embodiments. System environment 300 includes projector 210, a laser emission 340, optical element 350, emission pattern 360, and light projection 370 on object 330. Projector 210 may include any type of device that is capable of emitting light. For example, projector 210 may include a laser emitter, such as a vertical-cavity surface-emitting laser (VCSEL). Light emission 340 may have various characteristics, such as a beam size, a beam shape, a beam intensity, a beam wavelength, and so forth. In particular embodiments, light emission 340 may be a coherent, collimated emission of light (e.g., a laser). Light emission 340 may travel through system environment 300 in the form of a line, a grid, a torus, and so forth. In addition, light emission 340 may include multiple instances of one or more forms (e.g., two or more lines, two or more torus shapes, two or more grids, etc.).

In various embodiments, the light emission 340 may pass through one or more optical elements 350 to generated structured light used for depth sensing. The optical element 350 may include diffractive elements, refractive elements, and/or reflective elements. The optical element 350 may collimate the light emission 340, may focus the light emission 340, may split the light emission 340 into multiple beams, may diffuse the light emission preferentially along one or more axes to generate a line and/or a grid pattern, may focus and/or diffuse the light emission 340. In particular, the optical element 350 may include a collimator for collimating light, a beam splitter for splitting light emission 340 into two or more beams. In addition, the optical element 350 may include a line generator, such as a homogenizer with a non-periodic cross-section along one axis, a diffractive optical element with grating angular separation less than a spot angular width, a reflective or refractive surface curved along one dimension, and so forth.

In some embodiments, the optical element 350 may modify the light emission 340 to produce structured light with an emission pattern 360 (e.g., one or more lines) that propagate through the environment 300. In various embodiments, the emission pattern 360 interacts with physical objects (e.g., 330) in its path. The object could be, for example and not by way of limitation, a wall, a chair, a human, an animal, a tree, a plant, a curved surface, a mesh, and so forth. For example, object 330 may reflect and/or absorb some or all of the light emission. When the emission pattern 360 encounters an object in the environment (e.g., object 330), the line superimposes on the object 330, producing light projections 370. Light projections 370 may outline the contours of object 330, wrapping around curves, cusps, discontinuities, and so forth, thereby providing visual cues for textured or otherwise uneven surfaces and/or edges of object 330. Accordingly, the AR application may identify a distortion or discontinuity in the light projections 370, as compared to the expected emission pattern 360, to determine characteristics of the object 330.

FIG. 4A illustrates an example detection event, according to various embodiments. System environment 400 includes projector 210, light emission 340, optical element 350, emission pattern 360, object 330, reflected light 410, and image sensor 430 (e.g., of detector 220-1 or detector 220-2, shown in FIG. 2). Image sensor 430 may include a grid of pixels (which may also be referred to as photosites), one of which is identified as pixel 420-1. Certain pixels may detect the reflected light 410. For ease of reference, such pixels are referred herein as light-reflection pixels (e.g., one of which is identified as light-reflection pixel 422-1).

In various embodiments, the emission pattern 360 forms a light projection on object 330, which can be detected by the image sensor 430. In particular, the object 330 reflects a portion of the light emission pattern 360 towards the image sensor 430. In various embodiments, the object 330 may include specular surfaces and/or diffuse surfaces. Specular surfaces may preferentially deflect light at a particular angle (e.g., at an angle to the object surface normal that mirrors the incident angle to the normal of the light pattern 360). Diffuse surfaces reflect light in multiple directions, without preferential reflection at certain angles.

In various embodiments, the image sensor 430 may include an array of light-sensitive pixels, also referred to as photosites, such as pixels 420-1. When light from the environment 400 encounters a pixel, the pixel may generate a signal. For example, a voltage drop across the pixel 420-1 may increase or decrease proportionally to the intensity of light received by the pixel 420-1. Similarly, when reflected light 410 from the object 330 encounters a pixel 422-1, the pixel may generate a signal. As shown in FIG. 4A, reflected light 410 is detected by pixels 422-1. In some embodiments, the intensity of reflected light 410 may exceed an average intensity of ambient light in system environment 400. Accordingly, the AR application may apply an intensity discriminator to disambiguate between reflected light 410 corresponding to the emission pattern 360 and other light sources (referred herein as spurious light or spurious signals). This process, for example, may help select candidate pixels that are more likely to correspond to reflected light 410. In various embodiments, each candidate pixel may undergo the process described above with reference to FIG. 2 to verify that the pixel, in fact, corresponds to the reflected light 410 and its depth may be computed based on triangulation. Accordingly, the AR application may obtain a three-dimensional measurement of objects in system environment 400. In addition, as the position of the light projection generated by light pattern 360 moves along the surface of object 330 and/or moves around system environment 400, the AR application may continually generate depth and/or coordinate data from reflected light 410. The AR application may further compile the generated depth and/or coordinate data to form a three-dimensional depth map of object 330 and/or system environment 400. In further embodiments, the AR application may resolve the detection coordinates corresponding to reflected light 410 to sub-pixel accuracy, thereby increasing the detection resolution.

FIG. 4B illustrates an example detection event of a surface abnormality, according to various embodiments. System environment 405 includes projector 210, light emission 340, optical element 350, emission pattern 360, object 330, reflected light 410, and image sensor 430 (e.g., of detector 220-1 or detector 220-2, shown in FIG. 2). Image sensor 430 may include a grid of pixels (which may also be referred to as photosites), one of which is identified as pixel 420-1.

In addition, system environment 405 includes object 490 that partially occludes object 330 and introduces surface discontinuities between the edges of object 490 and the surface 330. Reflected light from object 490 (herein referred to as reflected light 415) strikes certain pixels of the image sensor 430, such as pixel 424-1, at locations that differ from the position at which reflected light 410 from the object 330 strikes the pixels (e.g., such as pixel 422-1), forming a discontinuous pattern. In various embodiments, the characteristics of the reflected light 415 indicate surface properties of object 490. In particular, the AR application may utilize the location, orientation, number, intensity, and/or distribution of pixels (e.g., pixel 424-1) that receive reflected light 415 to determine the surface properties of object 490 and/or the relationship between object 490 and object 330. For example, as shown, there is a discontinuity between pixels associated with reflected light 410 (e.g., pixel 422-1) and pixels associated with reflected light 415 (e.g., pixel 424-1). The AR application may analyze some or all of the displacement, orientation, number, intensity, and/or distribution of pixels associated with reflected light 410 relative to those of pixels associated with reflected light 415, in addition to the triangulation technique of FIG. 2, to characterize and image object 330, object 490, and the surface discontinuity between objects 330 and object 490. For example, in some embodiments, pixels (e.g., 424-1) associated with reflected light 415 may be located below, above, to the left, to the right, rotate to the left, rotated to the right, etc. relative to pixels (e.g., 422-1) associated with reflected light 410. Additionally, or alternatively, the pixels associated with reflected light 410 may have a different intensity, a different spatial distribution, and/or a different number of pixels relative to the pixels associated with reflected light 415.

Furthermore, in some embodiments, projector 210 may emit multiple instances of a light pattern 360 towards an object 330 and object 490 (e.g., two or more lines of laser light) to improve the efficiency of depth mapping (e.g., the depth of multiple regions of the environment may be simultaneously determined). Accordingly, image sensor 430 may receive reflected light from each instance of light pattern 360 that reflects off of objects in the environment 405. An application may analyze signals from the image sensor 430 to associate each signal with a particular instance of light pattern 360 emitted. The application may match or associate each light-reflection pixel (e.g., pixel 422-1 or 424-1 shown in FIG. 4B) detected by a detector (e.g., detector 220-1 and/or detector 220-2) with a particular instance of the emission pattern 360 reflected off of object 330 and/or object 490. In certain embodiments, to facilitate the matching process, each instance of the emission pattern 360 may have a unique signature (e.g., each line may have a different intensity, wavelength, temporal or spatial encoding, etc.).

In other embodiments, the instances of the emission pattern 360 may have identical lighting characteristics (e.g., same intensity, color, pitch, etc.), except for their relative ordering. The ordering may be used in particular embodiments to match each instance of emission pattern with detected lighting patterns. For example, the emission pattern 360 may include 5 lines that are vertically (and/or horizontally) spaced, oriented, and/or rotated from each other with a constant or variable separation distance and/or rotational angle. An application may analyze the detector signals generated by detector 220-1 and/or detector 220-2 to identify and determine the relative ordering of reflected lighting patterns. As an example, the projector may project 5 ordered lines that are parallel to one another and spaced to cover an expected field of view of the detectors. The reflected light from the 5 ordered lines, when detected by the detector, would maintain their relative ordering. In various embodiments, the reflected lighting patterns detected by the detector may be logically grouped so that the reflected lighting patterns belonging to the same group are deemed to correspond to the same projected line. In various embodiments, segments or pixels of reflected lighting patterns may be grouped based on their relative positions or other characteristics (a spatial separation distance, a spatial separation direction, a spatial orientation, and so forth) to other segments or pixels of reflected lighting patterns. For example, if a segment of reflected lighting pattern is closer to one group of reflected lighting patterns than any other group, then it may be classified as belonging to that group. By identifying groups of reflected lighting patterns and their relative ordering, the groups of reflected lighting patterns may be matched with respective projected lines. For example, the top-most projected line may be associated with the top-most group of detected lighting patterns, the second-from-the-top projected line may be associated with the second-from-the-top group of detected lighting patterns, and so forth. In various embodiments, a pixel belonging to a group may or may not, in fact, correspond to the projected line associated with that group. The embodiments described above with reference to FIG. 2 may be used to verify whether that pixel, in fact, corresponds to the projected line. If the pixel does correspond to the projected line, then an associated depth value may be determined and used to generate a depth map; otherwise, it may be discarded and would not contribute to the depth map.

Figure 5:
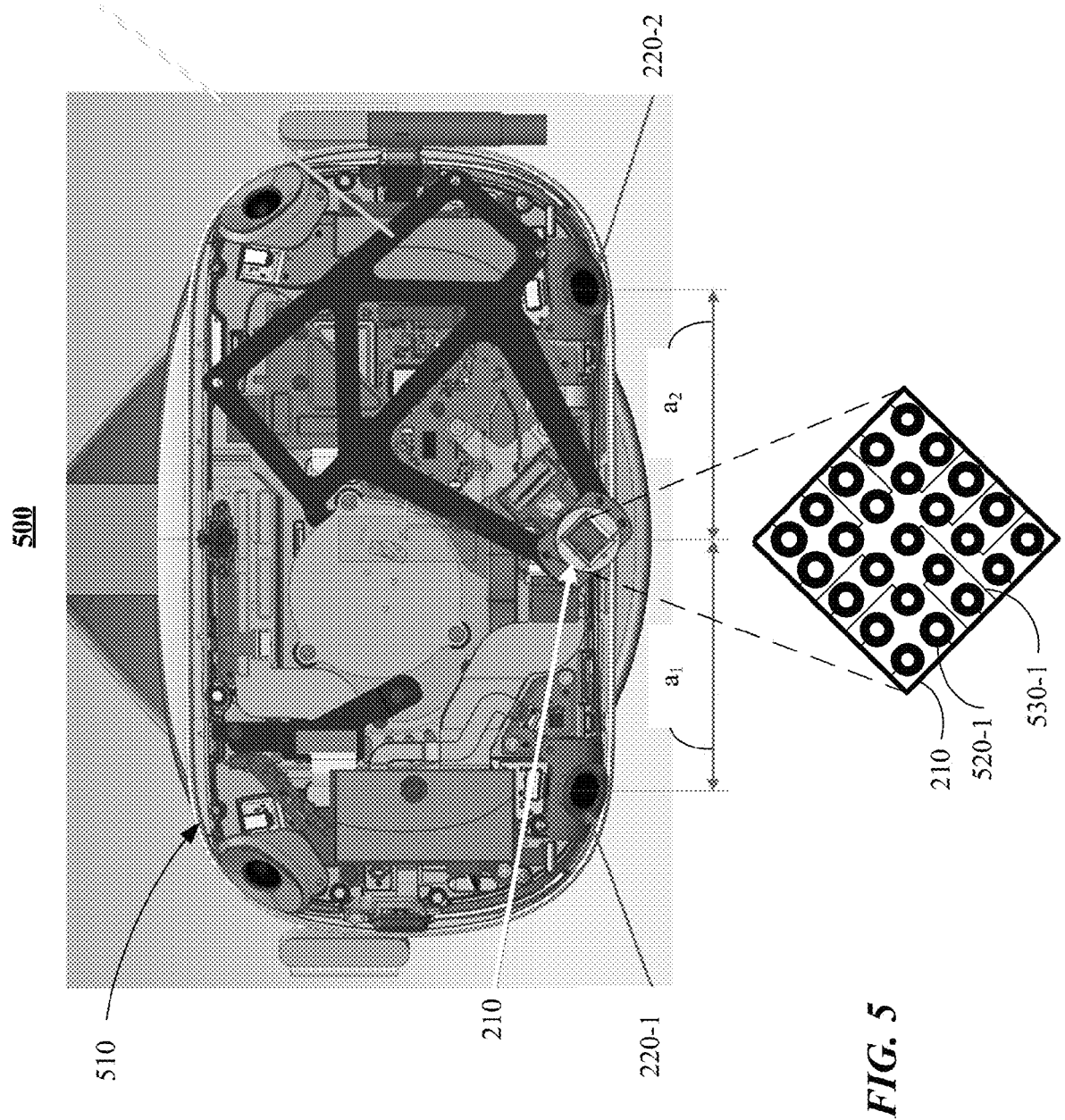
FIG. 5 illustrates an example head-mounted display, according to various embodiments.

FIG. 5 illustrates an example head-mounted display 510 that may be used to implement the embodiments described herein. System environment 500 includes head-mounted display 510, which includes detector 220-1, detector 220-2, projector 210, baseline $a_1$, and baseline $a_2$. In various embodiments, baseline $a_1$ is a distance between projector 210 and detector 220-1, and baseline $a_2$ is a distance between projector 210 and detector 220-2. In addition, projector 210 includes emitters (e.g., 520-1), and voltage supplies (e.g., 530-1).

In various embodiments, detector 220-1 and detector 220-2 (herein referred to generally as detectors 220) may be front-facing unfiltered cameras disposed on the corners of head-mounted display 510. These detectors 220 may function as inside-outside cameras for position tracking. As shown, the detectors 220 may be positioned and orientated on head-mounted display 510 to enable stereo imaging of system environment 500. In particular, detector 220-1 may be located on a right side of head-mounted display 510 (from the viewpoint of a user wearing the display 510) and generate a right image of system environment 500. Further, detector 220-2 may be located on the left side of the head-mounted display 510 and generate a left image of system environment 500.

Accordingly, the detectors 220 may detect light reflected off of objects in system environment 500. The AR application may analyze the detector data generated by the detector 220-1 and detector 220-2 when determining the position of the head-mounted display 510 in system environment 500. In particular, because each of detector 220-1 and detector 220-2 are unfiltered, each detector exhibits similar detection sensitivities to each wavelength of light. To isolate detector signals corresponding to reflected light emitted by projector 210, a computing system associated with the head-mounted display 510 may perform the embodiments described herein (e.g., the triangulation and verification process described with reference to FIG. 2).

Functionally, in some embodiments, each of detectors 220 may include a frame buffer. A frame buffer stores detection signals generated by a detector during an interval of time. A frame is a set of detector signals obtained during an interval of time. When the interval of time is complete, the frame is stored in the frame buffer and incoming detector signals are stored in a new frame until the next interval of time elapses. The frequency with which new frames are generated may be defined as a frame rate. In various embodiments, higher frame rates enable higher resolution detection of temporal changes in system environment 500, while concurrently producing a higher energy load. On the other hand, lower frame rates provide lower resolution detection of temporal changes in system environment 500, but produce a lower energy load. In various embodiments, the AR application may configure each detector 220 to operate at the same frame rate or different frame rates. Additionally, or alternatively, the AR application may dynamically select a frame rate at which each of detectors 220 operates. The AR application may further increase and/or decrease a frame rate based on one or more characteristics of system environment 500.

In some embodiment, the AR application may configure the detectors 220 to operate at a low frame rate. For instance, the AR application may configure the detectors 220 to operate between 10 and 50 frames per second, such as e.g. 30 frames per second (fps). In such embodiments, the energy load may be low. For example, the energy load may be, for example, between 10 and 50 milliwatts, such as 30 milliwatts. Accordingly, a smaller power supply may be sufficient to enable the operation of the detectors 220. Additionally, or alternatively, the effective lifespan of a power supply (e.g., on-board or external to the head-mounted display 510) may be increased. Furthermore, the bill of materials of each detector 220 may be inexpensive. For example, the bill of materials may be between $2 and $10, such as e.g., $6.

In various embodiments, the projector 210 may include one or more emitters 520 that emit light at one or more wavelengths. In some embodiments, each emitter or groups of emitters may be individually connected to a power supply (e.g., a voltage supply). Additionally, or alternatively, one or more rows and/or one or more columns of emitters 520 may be connected to a power supply. Accordingly, the AR application may control the intensity of light emitted by one or more individual emitters, by one or more pairs of emitters, one or more rows of emitters, by one or more columns of emitters, by one or more groups of emitters, and so forth. In so doing, the AR application may increase or decrease the intensity of light produced by the projector 210 and generate different emitted patterns. The AR application may further control the direction of a light emission produced by projector 210 by selectively turning on and/or off one or more emitters 520. For example, the AR application may turn on emitters 520 located on the leftward side of projector 210 and turn off emitters 520 located on the rightward side of projector 210 when directing a beam of light to the left. Similarly, the AR application may turn on and/or off emitters 520 to detect a beam of emitted light up, down to the right, to the left, and to angles of inclination between the right, left, up, and down.

In further embodiments, the AR application may sequentially turn on and/or off emitters 520 in order to generate a light emission with a particular form (e.g., a line, a grid, etc.). The light emission produces a light projection in a region of system environment 500. By turning on and/or off emitters 520, the AR application may control the portion of the region of system environment 500 that interacts with the light projection. In particular embodiments, the AR application may configure the projector 210 to generate a light projection that sequentially scans a selected region of system environment 500. The AR application may select the scanning frequency based on various parameters such as a detector frame rate, a number of objects in the selected region, a distance to one or more objects in the selected region, a type of object, a surface feature of one or more objects, a light noise level of system environment 500, a type of light pattern emitted by projector 210, and so forth.

In various embodiments, the AR application may turn on and/or off emitters 520 to increase and/or decrease the sparseness and/or density of a projected light pattern. For example, if the AR application determines that an object being imaged is close to the head-mounted display 510, then the AR application may reduce the intensity of light emitted by each emitter 520 and/or turn off one or more emitters 520 to increase the sparseness of a light pattern emitted by projector 210. Alternatively, if the AR application determines that an object is farther away in system environment 510 and/or that system environment is a noisy environment, then the AR application may configure increase the intensity of light emitted by the emitters 520 (e.g., by increasing the voltage supply to one or more of the emitters 520) and/or increase the density of the light pattern emitted by the projector 510 (e.g., by increasing the number of emitters 520 that produce light).

The head-mounted display 510 may be worn by a user. As the user moves through system environment 500, the position of the head-mounted display 510 may change. Accordingly, as the position of the head-mounted display 510 moves through the system environment 500, the AR application may configure the projector 210 to continuously, periodically, and/or sporadically emit light into system environment 500. In addition, the AR application may configure the detector 220-1 and the detector 220-2 to continuously detected ambient light in system environment 500. The AR application may further continuously analyze data from the detector 220-1 and the detector 220-2 to isolate detector signals corresponding to light produced by projector 210 that reflected off of objects in system environment 500. The AR application may also compute depth and/or coordinate information based on the isolated detector signals and add the computed information to a system environment map. Accordingly, as the head-mounted display moves throughout the environment, the AR application may build a system environment map of system environment 500, as described below with respect to FIG. 6A-6B.

In various embodiments, the projector 210 may be positioned at an angle to the orientation of the head-mounted device 510 (e.g., 45-degrees), such that as the user moves his or her head vertically or horizontally, the light pattern emitted by the detector sweeps the environment 500 vertically and horizontally simultaneously. Accordingly, the AR application may obtain vertical and/or horizontal information about a surface based on either vertical or horizontal movement of the head of the user.

Furthermore, the AR application may dynamically adjust various characteristics of the light pattern generated by projector 210 based on the characteristics of system environment 500. For instance, if the head-mounted display 510 is located at a position that is close to one or more objects, the AR application may reduce the output intensity of the projector 210. However, if the head-mounted display 510 moves to a position that is far away from objects in the system environment 500, the AR application may configure the projector 210 to increase an output intensity. Furthermore, if the AR application may review the current system environment map when determining how to modify the projector 210 and the detectors 220. If the AR application determines that an area of system environment 500 is well-mapped, then the AR application may reduce the frame rate of the detectors 220. However, if the AR application determines that an unmapped object is present in system environment 500 and/or that the position of a mapped object in system environment 500 has changed, the AR application may increase the frame rate of one or more of detectors 220-1 and detector 220-2.

In various embodiments, the AR application may dynamically adjust the emission intensity produced by projector 210 based on an amount of light that may be detected by an animate object (e.g., a human, an animal, etc.) located in system environment 500. In particular, the AR application may reduce an emission intensity and/or increase the sparseness of an emission pattern to keep a potential light detection intensity below a threshold intensity level. For example, if the AR application implements a dense laser pattern, then the AR application may reduce the output emission intensity to keep the potential light detection intensity below the threshold intensity level. Alternatively, in various embodiments, if the AR application implements a sparse light pattern, then the AR application may implement a higher output intensity for imaging object far away, as long as the potential light detection intensity remains below the threshold intensity level. Although the above description references, two detectors, this reference is non-limiting as one detector and/or three or more detectors are within the scope of this disclosure.

Figure 6B:
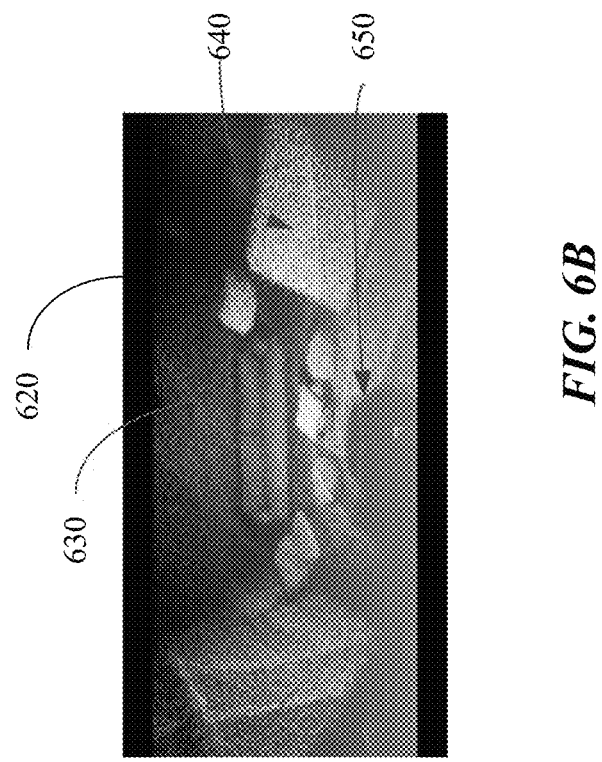
FIG. 6B illustrates a map portion of a system environment map of a system environment, according to various embodiments.
Figure 6A:
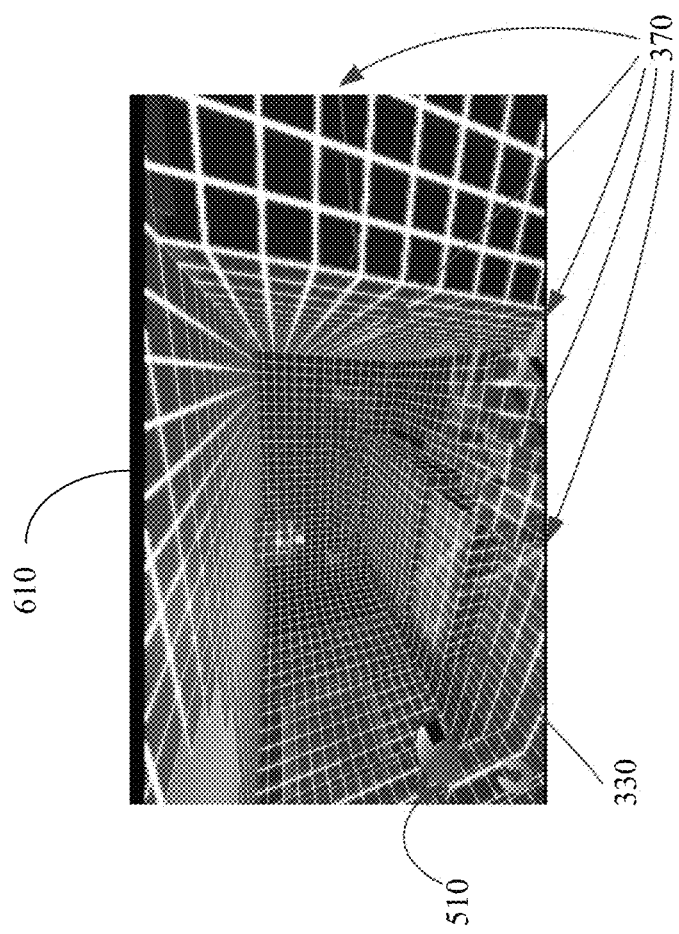
FIG. 6A illustrates an example system environment imaged by the head-mounted display of FIG. 5, according to various embodiments.

FIG. 6A illustrates an example system environment 610 imaged by the head-mounted display 500 of FIG. 5, according to various embodiments. In particular embodiments, system environment 610 includes objects 330, light projections 370, and head-mounted display 510. Head-mounted display 510 includes projector 210 and detectors 220, as described in greater detail with reference to FIG. 5. Projector 210 produces light emissions that form projections 370 on objects 330 in a region of system environment 610. Objects 330 may include a wall, a chair, a lamp, a human, an animal, etc. As the position and orientation of the head-mounted display 510 changes in system environment 610 (e.g., by a user, who is wearing the head-mounted display 510, walking, changing the position and/or orientation of his or her head, standing up, sitting down, bending, etc.), the region of system environment 610 on which projections 370 are formed changes. For example, the region may shift to the right, to the left, shift up, shift down, rotate, and so forth. Accordingly, the region of system environment 610 mapped by the AR application may also change.

In particular, for each region of system environment 610 on which the projections 370 are formed, the AR application may construct a depth map portion and add the depth map portion to a system environment map. For example, the AR application may add detected object to a system environment map if the object is detected by one or more detectors and/or if the depth value and/or position coordinate computed from detector signals generated by each detector is within a pre-determined confidence threshold.

If part or all of a map portion already exists in system environment map, then the AR application may update the pre-existing map portion of the system environment map with newly detected features described in the new map portion. In particular, the AR application may compare the pre-existing map portion of the system environment map with the newly generated map portion and further determine whether one or more features present in the newly generated map portion are present in the pre-existing map portion. If the AR application detects that at least one feature is present, then the AR application may add the at least one feature to the pre-existing map portion. Additionally, or alternatively, if the AR application determines that at least one feature of the pre-existing map portion is not present in the newly generated map portion, then the AR application may remove the at least one feature from the pre-existing map portion. Additionally, or alternatively, the AR application may replace a pre-existing map portion with a newly generated map portion. In addition, if the AR application determines that a part of a newly generated map portion is not included in system environment map, then the AR application may add the part of the newly generated map portion to the system environment map. In particular, the AR application implements the triangulation technique described herein to generate map portions of system environment map of system environment 610.

For example, if a new map portion is imaged with a higher density light emission, then one or more textural features may be present in the newly generated map portion that may not be present in the pre-existing map portion of the system environment map. The AR application may compare the pre-existing map portion of the system environment map with the newly generated map portion and determine that the textural features of the newly generated map portion are not present in the pre-existing map portion of the system environment map. Accordingly, the AR application may add the textural features of the newly generated map portion to the pre-existing map portion of the system environment map.

FIG. 6B illustrates a map portion 620 of a system environment map of system environment 610, according to various embodiments. In various embodiments, the AR application generates the map portion 620 (e.g., also referred to as a point cloud) by computing the depth and/or coordinates of light projections 370 formed on objects 330 of system environment 610. AR application combines the depth and/or coordinate data of the light projections 370 to form map portion 620. The generated map portions may be added to the system environment map as described with respect to FIG. 6A. In particular, map portion 620 includes objects 230 such as background object 630, and foreground object 640. In addition, system environment map includes edges 650.

In particular embodiments, as shown in map portion 620, the depth of two of more objects may be different. For example, background object 630 may have a larger depth value than foreground object 640. Accordingly, in some embodiments, pixels and/or voxels associated with background object 630 may share a larger depth value than pixels and/or voxels associated with foreground object 640. Similarly, one or more coordinates of two or more objects may be different. For example, background object 630 may have a larger or smaller lateral coordinate (e.g., x-coordinate) than foreground object 640. Accordingly, in some embodiments, pixels and/or voxels associated with background object 630 may share a larger or smaller lateral coordinate than pixels and/or voxels associated with foreground object 640. In addition, in some embodiments, the boundary between objects (e.g., edge 650) may be sharply defined. For example, at the boundary of an object 230, the light projection 370 of light emission may form an effect, such as a curve, a cusp, a discontinuity, etc. In addition, the computed depth value at either side of such an effect may differ significantly. In particular embodiments, the difference in the depth value at either side of the effect may be proportional to the physical difference in depth of the two or more objects from the projector 210 of the head-mounted display 510.

In further embodiments, map portion 620 may be generated from one or more angles. Accordingly, objects 230, facets of objects 230, and/or faces of objects 230 occluded from view in a first map portion 620 may form part of a second map portion 620. In various embodiments, a system environment map may be the union of each map portion 620. In particular, system environment map may include multiple faces and/or multiple facets of one or more objects 230 of system environment 610.

In additional embodiments, the head-mounted display 510 may be implemented in mixed-reality applications. For example, the AR application may implement the triangulation technique of FIG. 2 to generate a system environment map of system environment 610. The AR application may further generate one or more virtual reality objects. The AR application may insert the virtual reality objects within various positions of the system environment map to generate an augmented system environment map. The AR application may further display the augmented system environment map to a user via the head-mounted display 510. Accordingly, the augmented system environment map depicts the position of both real objects in system environment 610 and virtual objects inserted into a mixed-reality representation of system environment 610.

Figure 7:
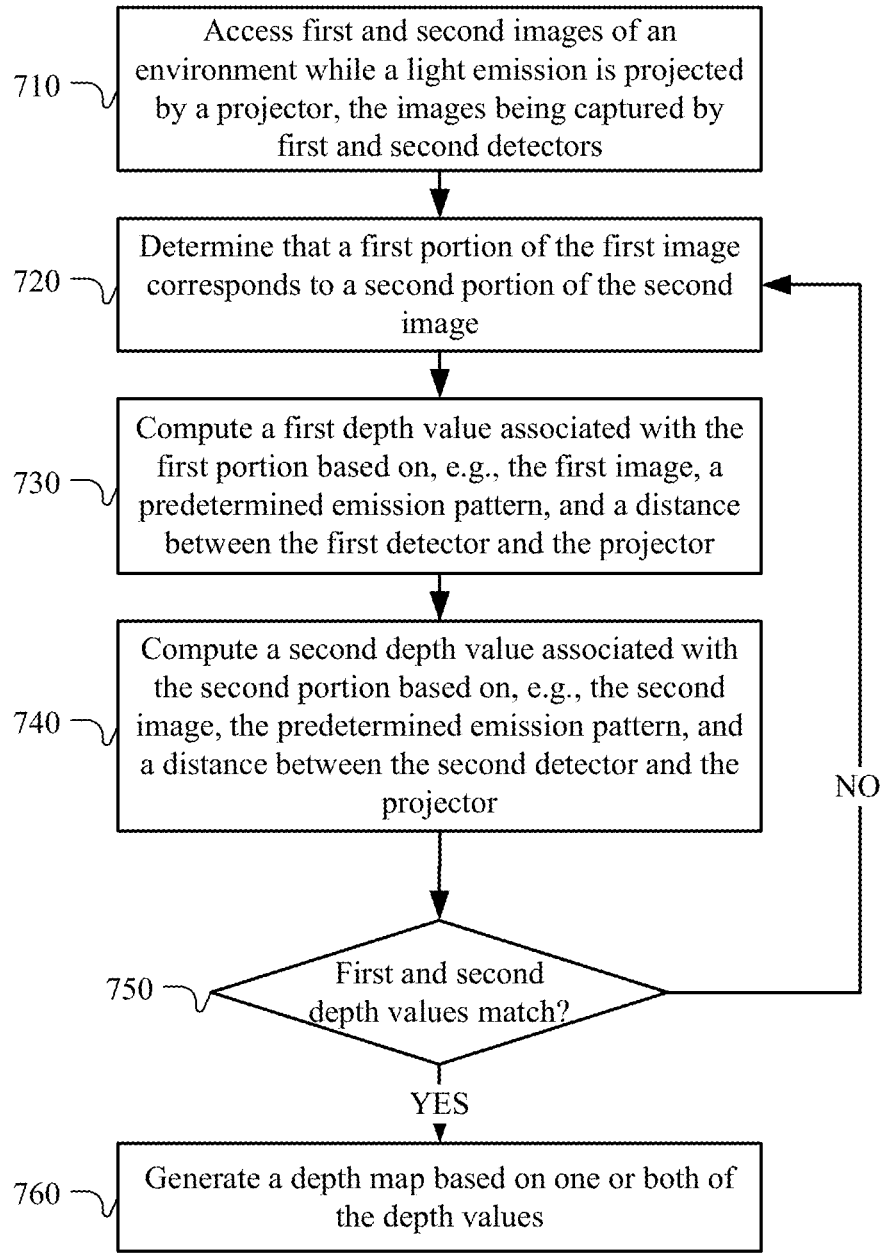
FIG. 7 illustrates an example method for performing depth sensing, according to various embodiments.

FIG. 7 illustrates an example method 700 for performing depth sensing, according to various embodiments. The method 700 may begin at step 710, where a computing system with one or more processors executing instructions in accordance with a software application (e.g., an augmented-reality or virtual-reality application) may access a first image and a second image captured by a first detector and a second detector, respectively. The first image and the second image may capture at least a common portion (e.g., due to the first detector and the second detector having an overlapping field of view) of an environment while a light emission with a predetermined emission pattern is projected into the environment by a projector. The first and second images may be captured at the same time or at substantially the same time (e.g., within one or two frames at a rate of 30 frames-per-second or 60 frames-per-second). The first detector (e.g., detector 220-1 in FIG. 2) and the projector (e.g., projector 210) may be separated by a first predetermined distance (e.g., $a_1$) and the second detector (e.g., detector 220-2) and the projector may be separated by a second predetermined distance (e.g., $a_2$).

In particular embodiments, the predetermined emission pattern of the light emission may be lines (e.g., 1, 2, or 5 lines), bands, grids, geometric shapes, or any other suitable pattern. In an embodiment where the emission pattern includes lines, the lines may be parallel to one another and may be oriented horizontally, vertically, or diagonally (e.g., at a 30-degree, 45-degree, or 63-degree angle relative to the horizontal plane). In particular embodiments, the emission pattern may have uniform lighting characteristics, such as intensity, wavelength, frequency, and pitch. For example, the lines projected may be generated from a single light source (e.g., the emission patterns 360 generated by laser emission 340, as shown in FIG. 3). In other embodiments, the projector may be configured to generate emission patterns with temporal, spatial, or lighting-characteristic encodings that allow for portions of the pattern to be identifiable based on the encodings. For example, a VCSEL laser may be used to generate lines so that each line has a unique intensity, wavelength, pitch, or temporal coding relative to the other lines.

In particular embodiments, the first detector, the second detector, and the projector may be part of a head-mounted display, such as the one shown in FIG. 5. In particular embodiments, the first and second detectors may be unfiltered inside-outside cameras used for other purposes other than detecting the structured light emission projected by the projector. For example, the images captured by the unfiltered cameras may be used for object detection (e.g., locating or drawing a bounding box around a chair or other object of interest in the captured image), object segmentation (e.g., identifying the pixels associated with the chair), and object identification (e.g., identifying the object as a chair). Such image-processing results may be achieved by inputting the captured images into a machine-learning model trained to perform the particular task (e.g., detection, segmentation, and/or identification). In particular embodiments, the images captured by the unfiltered cameras may further be used for stereo-based depth computations that do not rely on structured light.

At step 720, the computing system with one or more processors may determine that a first portion of the first image corresponds to a second portion of the second image. For example, a first pixel in the first image may be deemed to correspond to a second pixel in the second image. In particular embodiments, any suitable stereo correspondence or matching algorithm may be used. For example, the correspondence algorithm may first determine how the two images correspond to each other in the y-direction. Thereafter, the correspondence algorithm may scan across the x-direction in both images to find corresponding pixels or image features.

The detected portions may or may not correspond to the reflection of a portion of emitted lighting. In particular embodiments, the system may first perform a threshold inquiry as to whether either of the corresponding portions is sufficiently likely to correspond to the emitted light. This inquiry may be based on the detected wavelength (or color), intensity, or any other detected lighting characteristics that can be matched with the known lighting characteristics of the emitted lighting. If the portion(s) is sufficiently likely to correspond to the emitted lighting (e.g., the lighting characteristics are similar within a predetermined threshold degree), then the system may proceed to verify whether the identified portion of the image, in fact, corresponds to the emitted lighting. Otherwise, the system may discard the identified portion and not use it to compute depth based on the structured emitted lighting.

At step 730, the system may compute a first depth value associated with the first portion of the first image based on at least a location of the first portion within the first image, the predetermined emission pattern, and the first predetermined distance between the first detector and the projector. In particular embodiments, the computation may be based on triangulation techniques, such as the one described with reference to FIG. 2. For example, based on the location of the first portion within the first image, the system may identify a trajectory of a ray or line that extends through a representation of the first detector's location (e.g., location 250-1 in FIG. 2), such as the center of its lens, and the location of the first portion within the first image if the image is conceptually placed in the image plane of the first detector. The trajectory of the ray may then be used to compute a point of intersection with the known emission pattern of the emitted lighting. For example, an emitted line will form a dot on a wall, an emitted plane will form a line on a wall, etc. In an embodiment where a plane is emitted, the system may compute a point of intersection between the emitted plane and the trajectory of the ray, computed based on the location of the first portion of the first image. Based on the intersection point and the known geometries of the emitted pattern, the system may determine the angle $\theta_1$, as used in FIG. 2. The system may also determine the angle $\alpha_1$, as used in FIG. 2, based on the location of the first portion within the first image. Since the distance between the first detector and the projector is known (e.g., distance $a_1$), triangulation may be used to compute the depth value (e.g., b, as shown in FIG. 2) based on angle $\theta_1$, angle $\alpha_1$, and distance $a_1$.

At step 740, the system may similarly compute a second depth value associated with the second portion of the second image based on at least a location of the second portion within the first image, the predetermined emission pattern, and the second predetermined distance between the second detector and the projector. As with step 730, triangulation may be used to compute the second depth value, except that the angle $\theta_2$, angle $\alpha_2$, and distance $a_2$ are determined from the perspective of the second detector.

At step 750, the system may compare the first depth value and the second depth value and determine whether there is a match in accordance with one or more predetermined criteria. For example, the system may determine that a match is found when the first depth value and the second depth value are within a predetermined threshold value or ratio of each other, or if a difference between the two depth values is within a predetermined threshold. In particular embodiments, when the first depth value and the second depth value fail to match, the system may disregard the first depth value and the second depth value in the generation of the depth map, and the process may return to step 720 to examine other portions of the images. On the other hand, when the first depth value and the second depth value match in accordance with one or more predetermined criteria, the system may proceed to step 760, where a depth map is generated using the information derived from the first and/or second images. For example, the system may generate a depth map of the environment based on at least one of the first depth value or the second depth value. The depth value used may be represented as a point in the point cloud, for instance. Through this process, the system may generate a depth map of the environment by processing several portions of the first and second images, as well as portions of other images as the projector scans the environment.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order, include all or some of the steps of the method of FIG. 7. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
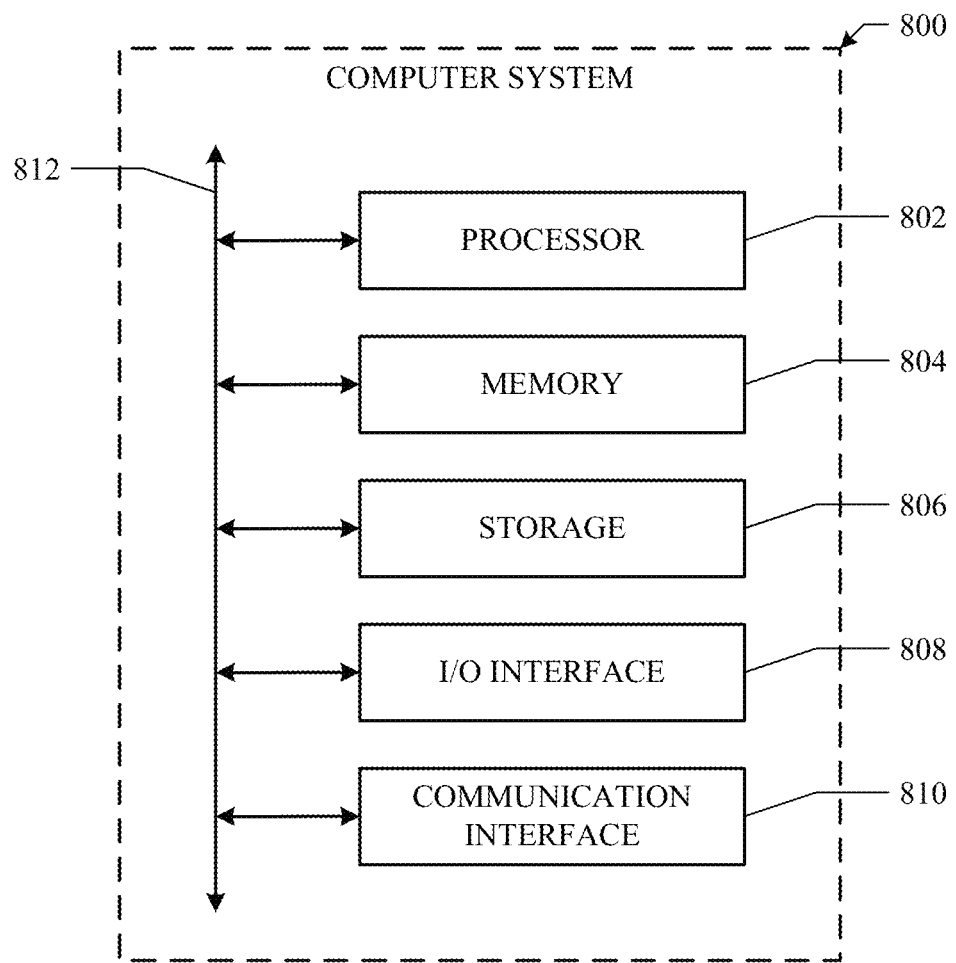
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system comprising:
a projector electronic device configured to project a light emission with a predetermined emission pattern into an environment;
a first detector electronic device and a second detector electronic device configured to respectively capture a first image and a second image of at least a common portion of the environment while the light emission is projected, wherein the first detector electronic device and the projector electronic device are separated by a first predetermined distance and the second detector electronic device and the projector electronic device are separated by a second predetermined distance; and
at least one processor configured to:
determine that a first portion of the first image corresponds to a second portion of the second image;
compute a first depth value associated with the first portion of the first image based on a first triangulation calculation corresponding to a first triangle, the first triangle having corners corresponding to the first detector electronic device, the projector electronic device, and a portion of an object depicted in the first portion of the first image, and the first triangle being formed using at least a location of the first portion within the first image, the predetermined emission pattern, and the first predetermined distance between the first detector electronic device and the projector electronic device;
compute a second depth value associated with the second portion of the second image based on a second triangulation calculation corresponding to a second triangle, the second triangle having corners corresponding to the second detector electronic device, the projector electronic device, and a portion of the object depicted in the second portion of the second image, and the second triangle being formed using at least a location of the second portion within the second image, the predetermined emission pattern, and the second predetermined distance between the second detector electronic device and the projector electronic device; and
generate a depth map of the environment based on at least one of the first depth value or the second depth value.

2. The system of claim 1, wherein the at least one processor is further configured to disregard the first depth value and the second depth value in the generation of the depth map when the first depth value and the second depth value fail to match in accordance with one or more predetermined criteria.

3. The system of claim 1, wherein the projector electronic device, the first detector electronic device, and the second detector electronic device are part of a head-mounted display.

4. The system of claim 3, wherein the first detector electronic device and the second detector electronic device are unfiltered cameras.

5. The system of claim 4, wherein the at least one processor is further configured to identify objects in the environment based on at least the first image or the second image.

6. The system of claim 1, wherein the predetermined emission pattern comprises two or more parallel lines.

7. The system of claim 6, wherein the two or more parallel lines are oriented diagonally.

8. The system of claim 1, wherein the first detector electronic device and the second detector electronic device are configured to capture the first image and the second image at a same time.

9. The system of claim 1, wherein, in accordance with one or more predetermined criteria, the first depth value and the second depth value match if a difference between the first depth value and the second depth value is within a predetermined threshold.

10. A method comprising, by a computing system:
accessing a first image and a second image of at least a common portion of an environment while a light emission with a predetermined emission pattern is projected by a projector electronic device, wherein the first image and the second image are respectively captured by a first detector electronic device and a second detector electronic device, and wherein the first detector electronic device and the projector electronic device are separated by a first predetermined distance and the second detector electronic device and the projector electronic device are separated by a second predetermined distance;
determining that a first portion of the first image corresponds to a second portion of the second image;
computing a first depth value associated with the first portion of the first image based on a first triangulation calculation corresponding to a first triangle, the first triangle having corners corresponding to the first detector electronic device, the projector electronic device, and a portion of an object depicted in the first portion of the first image, and the first triangle being formed using at least a location of the first portion within the first image, the predetermined emission pattern, and the first predetermined distance between the first detector electronic device and the projector electronic device;
computing a second depth value associated with the second portion of the second image based on a second triangulation calculation corresponding to a second triangle, the second triangle having corners corresponding to the second detector electronic device, the projector electronic device, and a portion of the object depicted in the second portion of the second image, and the second triangle being formed using at least a location of the second portion within the second image, the predetermined emission pattern, and the second predetermined distance between the second detector electronic device and the projector electronic device; and
generating a depth map of the environment based on at least one of the first depth value or the second depth value.

11. The method of claim 10, further comprising:
determining that a third portion of the first image corresponds to a fourth portion of the second image;
computing a third depth value associated with the third portion of the first image;
computing a fourth depth value associated with the fourth portion of the second image; and
determining that the third depth value and the fourth depth value fail to match in accordance with one or more predetermined criteria;
wherein the third depth value and the fourth depth value are disregarded in the generation of the depth map.

12. The method of claim 10, wherein the projector electronic device, the first detector electronic device, and the second detector electronic device are part of a head-mounted display.

13. The method of claim 12, wherein the first detector electronic device and the second detector electronic device are unfiltered cameras.

14. The method of claim 13, further comprising:
identifying objects in the environment based on at least the first image or the second image.

15. One or more computer-readable non-transitory storage media embodying software that is operable when executed to:
access a first image and a second image of at least a common portion of an environment while a light emission with a predetermined emission pattern is projected by a projector electronic device, wherein the first image and the second image are respectively captured by a first detector electronic device and a second detector electronic device, and wherein the first detector electronic device and the projector electronic device are separated by a first predetermined distance and the second detector electronic device and the projector electronic device are separated by a second predetermined distance;
determine that a first portion of the first image corresponds to a second portion of the second image;
compute a first depth value associated with the first portion of the first image based on a first triangulation calculation corresponding to a first triangle, the first triangle having corners corresponding to the first detector electronic device, the projector electronic device, and a portion of an object depicted in the first portion of the first image, and the first triangle being formed using at least a location of the first portion within the first image, the predetermined emission pattern, and the first predetermined distance between the first detector electronic device and the projector electronic device;
compute a second depth value associated with the second portion of the second image based on a second triangulation calculation corresponding to a second triangle, the second triangle having corners corresponding to the second detector electronic device, the projector electronic device, and a portion of the object depicted in the second portion of the second image, and the second triangle being formed using at least a location of the second portion within the second image, the predetermined emission pattern, and the second predetermined distance between the second detector electronic device and the projector electronic device; and
generate a depth map of the environment based on at least one of the first depth value or the second depth value.

16. The media of claim 15, wherein the software is further operable when executed to:
determine that a third portion of the first image corresponds to a fourth portion of the second image;
compute a third depth value associated with the third portion of the first image;
compute a fourth depth value associated with the fourth portion of the second image; and
determine that the third depth value and the fourth depth value fail to match in accordance with one or more predetermined criteria;
wherein the third depth value and the fourth depth value are disregarded in the generation of the depth map.

17. The media of claim 15, wherein the projector electronic device, the first detector electronic device, and the second detector electronic device are part of a head-mounted display.

18. The media of claim 17, wherein the first detector electronic device and the second detector electronic device are unfiltered cameras.

19. The media of claim 18, wherein the software is further operable when executed to:
identify objects in the environment based on at least the first image or the second image.

* * * * *